United States Patent [19]
Niimura

[11] Patent Number: 5,379,559
[45] Date of Patent: Jan. 10, 1995

[54] SEMISUBMERSIBLE BUILDING

[76] Inventor: Masateru Niimura, 6-4-4, Ohmori Nishi, Ohta-ku, Tokyo, Japan

[21] Appl. No.: 981,103

[22] Filed: Nov. 24, 1992

[30] Foreign Application Priority Data

Nov. 29, 1991 [JP] Japan .................. 3-356137
Dec. 6, 1991 [JP] Japan .................. 3-360416

[51] Int. Cl.⁶ .................. E02B 17/00; B63B 35/44
[52] U.S. Cl. .................. 52/169.7; 405/205; 405/207; 405/224
[58] Field of Search .............. 52/169.7; 405/205, 207, 405/224

[56] References Cited

U.S. PATENT DOCUMENTS

| | | | |
|---|---|---|---|
| 2,972,973 | 2/1961 | Thearle | 405/205 |
| 3,738,113 | 6/1973 | Modary et al. | 405/205 |
| 4,114,392 | 9/1978 | Lamy | 405/205 |
| 4,181,453 | 1/1980 | Vache | 405/205 |
| 4,241,685 | 12/1980 | Mougin | 405/205 |
| 4,626,137 | 12/1986 | Willemsz | 405/205 |
| 4,674,918 | 6/1987 | Kalpins | 405/224 |
| 4,966,495 | 10/1990 | Goldman | 405/224 |
| 5,049,004 | 9/1991 | Niimura | 405/204 |
| 5,088,859 | 2/1992 | Devlin | 405/224 |

Primary Examiner—Carl D. Friedman
Assistant Examiner—Christopher Todd Kent
Attorney, Agent, or Firm—Armstrong, Westerman, Hattori, McLeland & Naughton

[57] ABSTRACT

A large semisubmersible building is made up of a submerged section installed underwater, an intermediate section consisting of a plurality of column structures erected on the submerged section at specified intervals, and an above-water section built upon the intermediate section so that it is always situated above water. The submerged section is made larger than the above-water section. Because of this construction, the large semisubmersible building remain stable and stationary at a specified depth of water even in stormy weather conditions. When the water level changes or when the specific gravity of the building changes as a result of changes in the weight of goods stored in the building, the semisubmersible building can be stably held at the specified depth of water.

10 Claims, 7 Drawing Sheets

SEMISUBMERSIBLE BUILDING

FIELD OF INDUSTRIAL APPLICATION

The present invention relates to a large semisubmersible building installed underwater and more specifically to a semisubmersible building that can be held stationary at a desired depth of water by changing the specific gravity of the building and which remains stable even in stormy weather conditions such as strong typhoons (or hurricanes).

DESCRIPTION OF THE PRIOR ART

With the population in urban regions rapidly growing in recent years, it is becoming more and more difficult to procure an area of land on which to construct a building. In constructing large buildings such as warehouses or garages where no humans live, it is effective in terms of utilization of land to have such buildings constructed at the sea floor or at the bottom of the water.

Conventional methods of constructing large underwater buildings such as warehouses and garages at sea floor or at the bottom of the water consists in building a structure at land, towing the structure to the installation site by a ship and sinking it to the sea floor. Hence, the size of the structure that can be built is limited to the one that can be towed by a ship. Since the building can normally be towed when there is no wave, a long construction period is required. Further, since the building must be installed horizontally at the bottom of the water, the work for lowering the building to the sea floor is complex and difficult. Moreover, because such underwater structures require a stable, firm foundation, the construction work takes a long period resulting in a huge cost.

Another known conventional method consists of driving sheetings or flashboards into sea floor or erecting a wall of stones and soil to demarcate an area of water where the underwater structure is to be built, discharging water from the demarcated area, and then constructing the underwater building in the same way as an ordinary building is constructed on land.

This method has an advantage of a greater freedom in that the size of the underwater structure is not limited. It also permits a desired size of structure to be built without being affected by water or waves. There are drawbacks, however. Since a specified area of water must be sealed off and the water be evacuated to keep the interior of the sealed area in the same condition as on land, the construction site is limited to shallow waters and the work period becomes necessarily long, increasing the cost of construction.

The inventor of this invention proposed (in the Japanese Patent Application No. 10004/1989) an underwater building which can solve the aforementioned problems experienced with the conventional construction methods. The previously proposed method employs a novel construction method that allows a large structure to be built underwater in the same way as an ordinary structure is built on land. This method shortens the work period and reduces the cost significantly, and also assures safety of the building after installation. Furthermore, the proposed underwater building can be used for multiple purposes and does not require a foundation work.

The underwater building that the inventor of this invention had proposed consists of a foundation body lightly fixed to sea floor and a building body erected on the foundation body. The foundation body is afloat on the water surface before the building body is completed. The building body has a two-layer structure with a space between an outer circumferential wall and an inner circumferential wall. The building body is sunk in water by pumping water into or out of that space or by a weight so that only an entrance tower portion formed at the top of the building body is projected above water.

PROBLEMS OF PRIOR ART

With the underwater building previously proposed by this inventor, however, when the water level changes or the specific gravity of the underwater building varies due to an increase or decrease in the weight of accommodated goods, it is difficult to keep the underwater building at a specified depth from the water surface, making it unsuitable for the building to be installed where the water level changes are large and also making it impossible to store heavy goods which would change the specific gravity of the building.

This invention has been accomplished in light of the above-mentioned drawbacks. That is, the object of the invention is to provide a semisubmersible building improved over the previously proposed underwater building which can easily be held stationary at a specified depth according to the changed specific gravity even at locations where there are large water level changes, and which can also accommodate heavy goods.

It is also an object of the invention to provide a semisubmersible building which can be held stable and stationary at a specified position in water by minimizing the pressure of winds and waves exerted on the building.

DISCLOSURE OF THE INVENTION

To achieve the above objective, the semisubmersible building of this invention has a building body formed as a two-layer structure with a space or chamber between an outer circumferential wall and an inner circumferential wall. The building body which pumps water into or out of the chamber is sunk in water so that only an entrance tower portion formed at the top of the building body is projected above water. The building body is pulled under tension by cable means so that it is kept stationary at a specified depth of water. One end of the cable means is connected to a winding means installed in the building body. By rotating the winding means in a forward or reverse direction, the building body which rises or sinks according to changes in its specific gravity can be held stationary at the specified depth.

Also, to keep at a specified depth the building body which rises or sinks according to variations in its weight or specific gravity, this invention has the following features. The semisubmersible building has its building body formed as a two-layer structure with a space or chamber between an outer circumferential wall and an inner circumferential wall. The building body which pumps water into or out of the chamber is sunk in water so that only an entrance tower portion formed at the top of the building body is projected above water. The building body is pulled under tension by cable means so that it is kept stationary at a specified depth of water. One end of the cable means is connected to a winding means installed in the building body. The winding means is turned in a forward or reverse direction and at the same time water is pumped into or out of the chamber formed between the outer and inner circumferential walls so that the building body which rises or sinks according to changes in its specific gravity can be held stationary at the specified depth.

Furthermore, to minimize the pressure of winds and waves exerted on the building for improved stability, this invention has the following features. The semisubmersible building consists of a submerged section installed underwater, an intermediate section made up of a plurality of column structures erected on the submerged section at specified intervals, and an above-water section erected on the intermediate section so that it is always situated above water. At least the submerged section has a two-layer structure with a space or chamber formed between the outer and inner circumferential walls. The building body is sunk in water by pumping water into or out of the chamber. The submerged section is pulled under tension by a cable means and held stationary at a specified depth of water. One end of the cable means that holds the submerged section is connected to a winding means installed in the building body. The winding means is turned in a forward or reverse direction and at the same time water is pumped into or out of the chamber formed between the outer and inner circumferential walls so that the building body which rises or sinks according to changes in its specific gravity can be held stationary at the specified depth.

In the above third invention, it is possible to install a lifting means such as an elevator inside the intermediate section of the semisubmersible building to communicate the submerged section and the above-water section with each other.

In the semisubmersible building according to each of the above inventions, the cable means may consist of a plurality of cables and these cables may be used in pairs, with one of each pair connected to the winding means in an untensed condition so that it does not pull the building body. This arrangement prevents the semisubmersible building from losing its stable and stationary state when the other cable under tension should break due to deterioration over time.

DETAILED DESCRIPTION OF PREFERRED EMBODIMENT

Now, this invention will be, described in detail in connection with embodiments shown in the attached drawings.

FIG. 1 through 6 show a semisubmersible building H as the first embodiment of this invention. A semisubmersible structure H of this embodiment consists of an in-water or submerged section 1 installed below the water surface W; an intermediate section 2 made up of a plurality of column structures erected on the submerged section 1 at specified intervals; an above-water section 3 built on the intermediate section 2 and always situated above the water surface W; and a plurality of cables $S_1$ connected to the submerged section 1 to hold the semisubmersible building H stationary at a specified depth of water. The submerged section 1 of the building H is submerged below the water surface W and moored to the bottom of the water L. In this embodiment, the submerged section 1 is constructed on the foundation body 4 anchored to the sea floor L.

Figure 2:
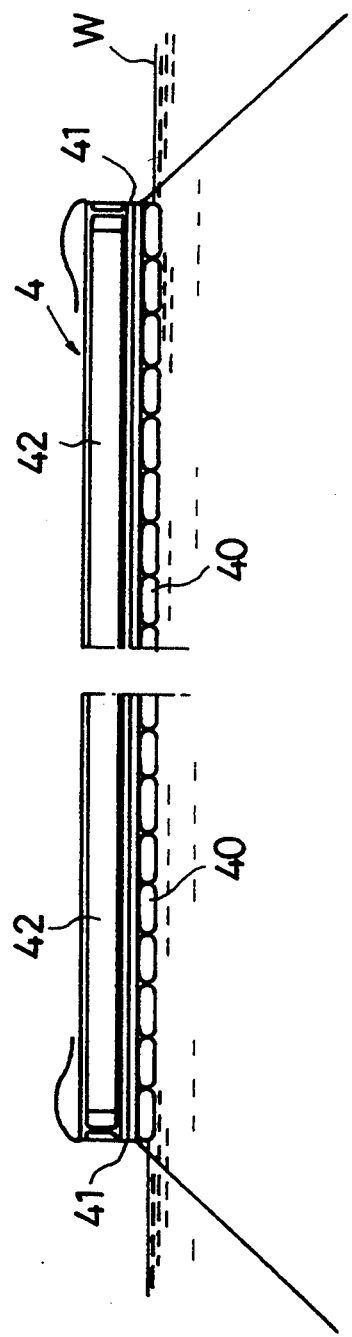
FIG. 2 is a partly cutaway enlarged front view of the foundation body.
Figure 3:
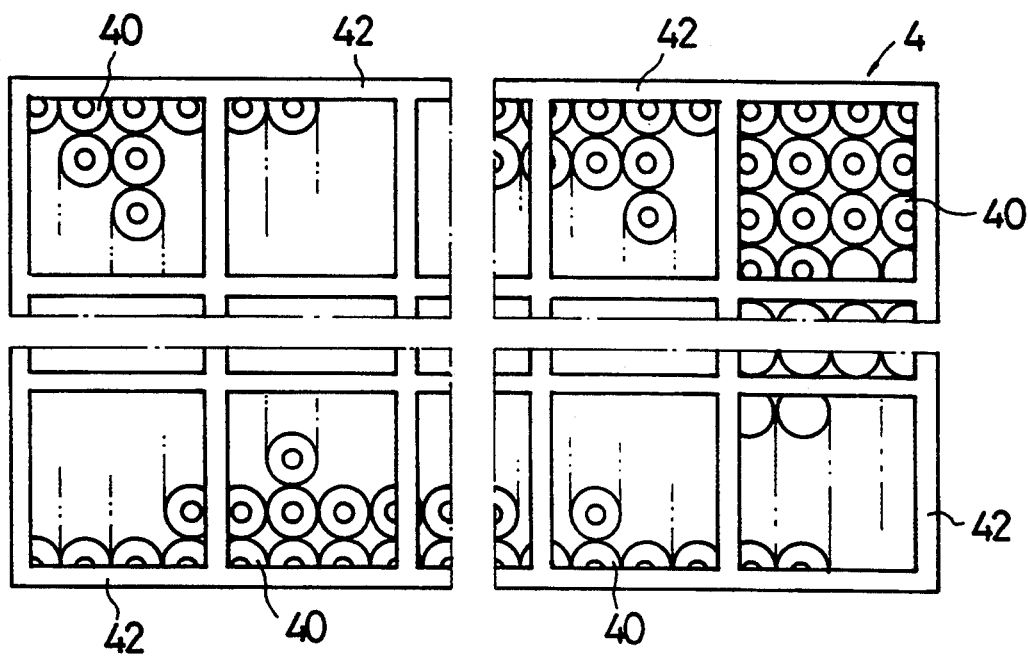
FIG. 3 is a partly cutaway enlarged plan view of the foundation body.

The foundation body 4, as shown in FIG. 2 and 3, consists of a number of float members 40 each formed of a tire tube, a binding frame 4i arranged on the upper side of the float members 40 to bind them together, and a support frame 42 made of steel which is arranged on the upper side of the binding frame 41 and formed integral with it. The large number of float members 40 produce a large buoyancy.

The large number of float members 40 may be formed of polystyrene foam with a large buoyancy, instead of the tire tubes.

The foundation body 4 is formed so as to produce as large a buoyancy as possible. To described more precisely, the buoyancy of the foundation body 4 is such that only the foundation body 4 can be floated above the water surface W and that the foundation body 4 will not sink to the sea floor when it is loaded on its upper surface with materials that are used to construct the submerged section 1 of the building or if the first-story part of the submerged section 1 is built on it. (See FIG. 4.)

The foundation body 4 of such a construction is towed by a ship to the installation site of the semisubmersible structure H or it is built at the site.

At the installation site, while afloat on the water surface W, the foundation body 4 is connected to anchors U (FIG. 1) fixed in the sea floor L to prevent it from being carried away by currents.

Figure 1:
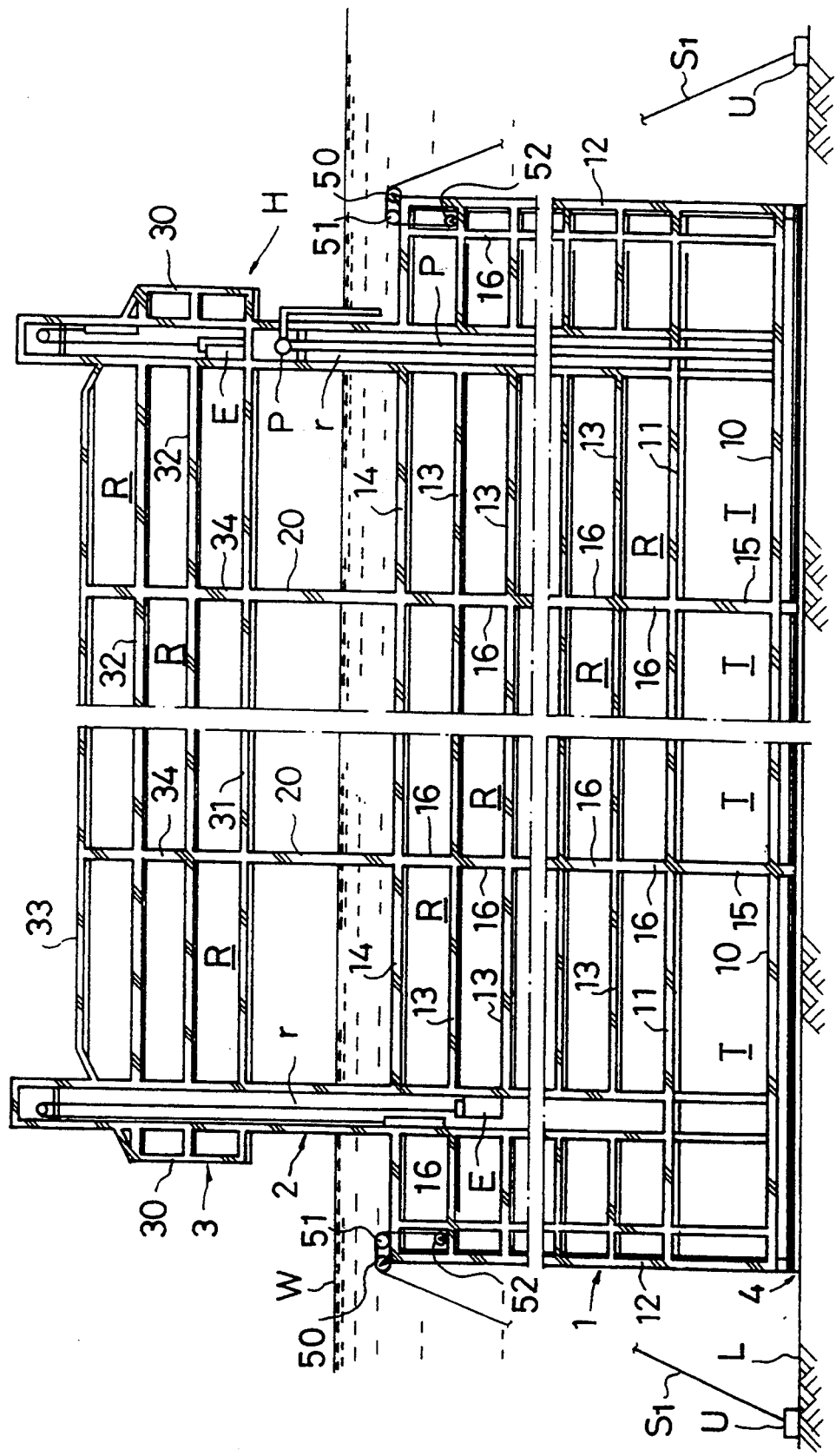
FIG. 1 is a partly cutaway vertical cross section of the semisubmersible building as a first embodiment of this invention.

The submerged section 1, as shown in FIG. 1, has in its bottom portion a water volume adjust chamber T defined by a foundation floor 10, a bottom floor 11 and an outer wall 12. Above the water volume adjust chamber T there are a plurality of intermediate floors 13 and a ceiling floor 14 thus forming partitioned spaces R in multiple stories.

The water volume adjust chamber T is compartmented by walls 15. Likewise, the partitioned spaces R in multiple stories between the bottom floor 11 and the ceiling floor 14 are compartmented by inner walls 16. Between the inner wall 16 and the outer wall 12 is installed a motor 52 which winds up or down the cable $S_1$.

Figure 4:
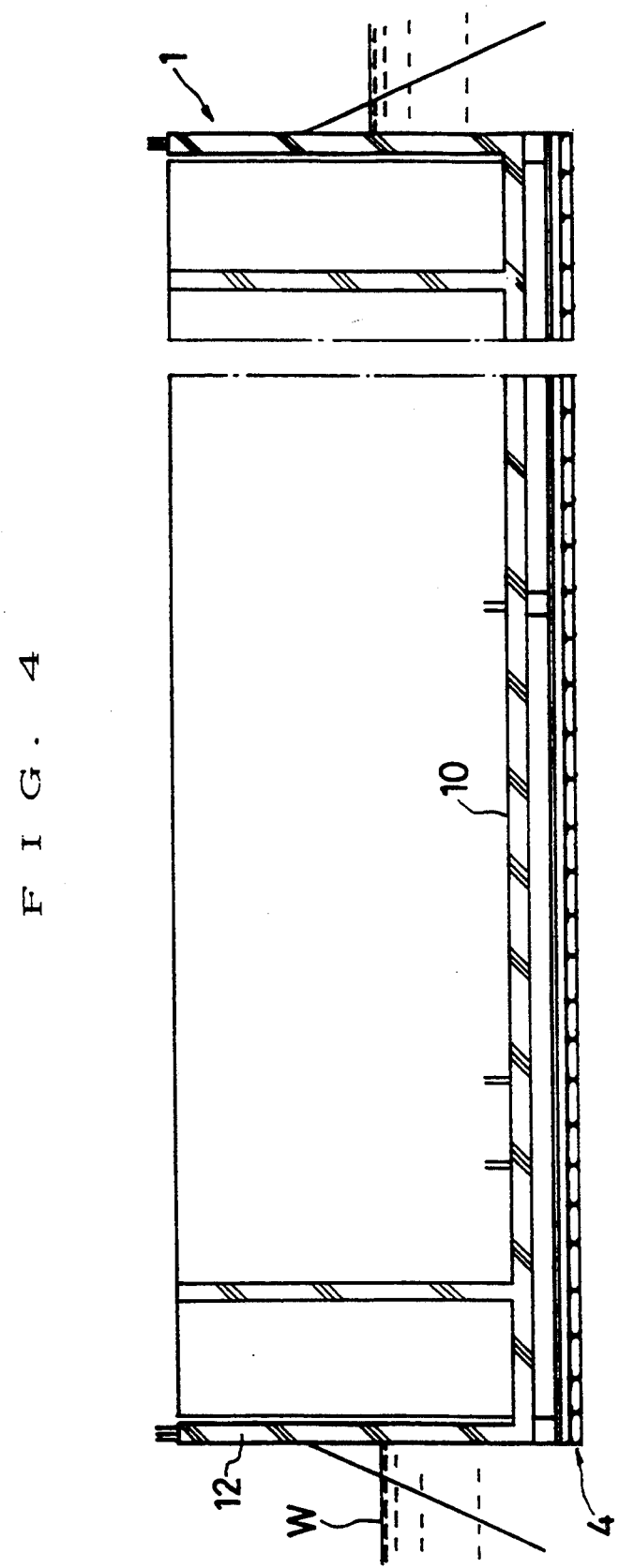
FIG. 4 is an enlarged vertical cross section showing the foundation floor and a first-story part of the outer wall of the submerged section built on the upper side of the foundation body.

The submerged section of the building is constructed in the following manner. As shown in FIG. 4, the foundation floor 10 is constructed on the upper side of the foundation body 4. On the foundation floor 10, the outer wall 12 is built to the combined height of the water volume adjust chamber T and the first-story part of the partitioned space R.

Thus, a pool-shaped structure, U-shaped in a vertical cross section, is formed on the upper side of the foundation body 4. In this enclosed structure it is possible to perform various works from now on, without being affected by winds or waves.

Figure 5:
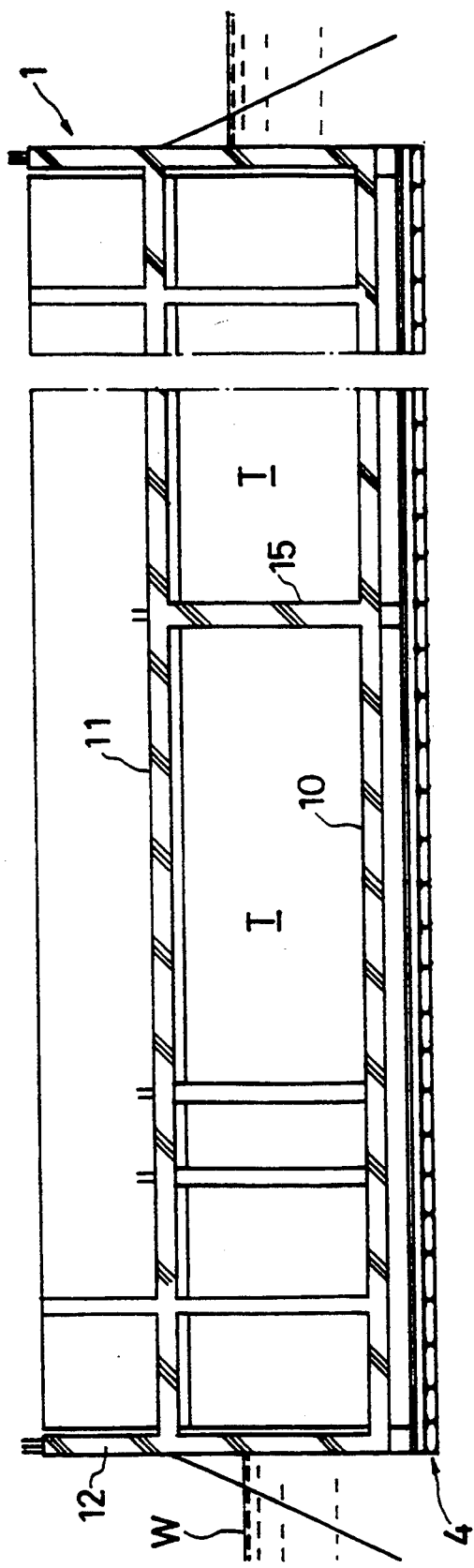
FIG. 5 is an enlarged vertical cross section showing a first-story part of the submerged section and the water volume adjust chamber at the bottom of the submerged section.

With the outer wall 12 erected, the bottom floor 11 is formed above the foundation floor 10, as shown in FIG. 5. Building walls 15 compartmentalizes the water volume adjust chamber T defined by the bottom floor 11 and the foundation floor 10.

Figure 6:
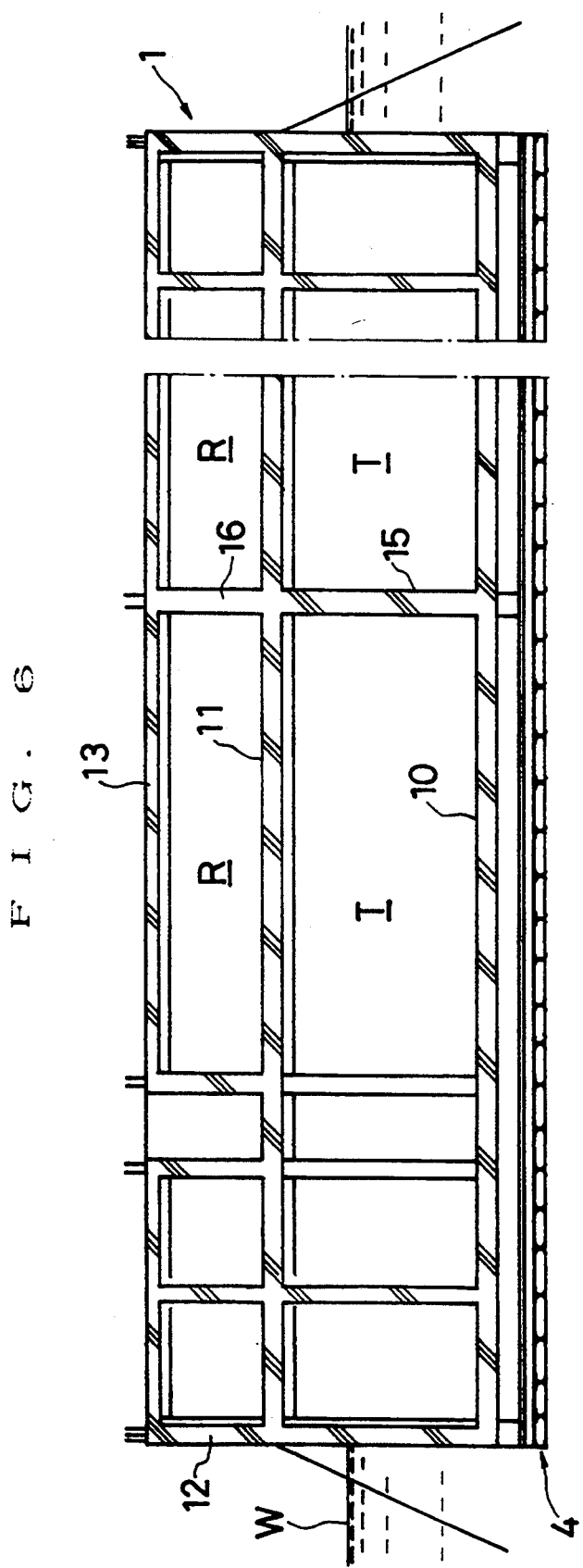
FIG. 6 is an enlarged vertical cross section showing multiple stories of the submerged section of the semisubmersible building.

Next, as shown in FIG. 6, the inner walls 16 are built on the bottom floor 11, and at the same time the intermediate floor 13 is mounted on the upper ends of the inner walls 16 to form compartmented spaces R.

The process of constructing the inner walls 16, extending the outer wall 12 and mounting the intermediate floors 13 is repeated to form compartmented spaces R in multiple stories. Then, the ceiling floor 14 is formed to complete the submerged section 1.

The inner walls 16, bottom floor 11, and ceiling floor 14 are formed of such materials as reinforced concrete or steel-framed reinforced concrete that have an excellent water-resisting quality and pressure withstandability. They are so formed as to keep the submerged section 1 watertight. These walls are so built as to ensure watertightness of the submerged section 1. The outer wall 12 and the foundation floor 10 may be formed of a material and a construction whose water-resisting quality is equal to or slightly lower than that of the inner wall 16, bottom floor 11 and ceiling floor 14.

The intermediate section 2, as shown in FIG. 1, consists of a plurality of column structures integrally erected on the submerged section 1, with the lower half of the intermediate section situated below the standard water level and the upper half above it. In this embodiment, the intermediate section 2 is high enough to allow waves more than 20 meters high to pass therethrough.

The intermediate section 2 is formed in such a shape, say cylindrical shape, as will make the pressure of winds and waves acting on the outer wall as small as possible, when compared with the pressures received by the submerged section i and the above-water section 3. Some of these cylindrical columns have a long internal space r at their intermediate portion.

This internal space r has two purposes. One of the internal spaces r is used to accommodate a pipe p connected to a pumping equipment P installed in the intermediate section 2 to supply external water into the water volume adjust chamber T or discharge water from the chamber. Hence, this space r is extended also into the submerged section 1.

Another internal space r is used as a passage for humans and goods to be moved between the above-water section 3 and the submerged section 1. This space r accommodates such lifting means E as an elevator or lift. This lifting means E can move up or down into the submerged section 1 and the above-water section 3.

The intermediate section 2 is constructed of reinforced concrete or steel-framed reinforced concrete with excellent water-resisting quality and pressure withstandability. The intermediate section is so built as to ensure watertightness.

The intermediate section 2 may be formed of a plurality of ordinary solid columns 20 with no hollow space therein to increase the strength. In this case, each of the columns 20 extends as a so-called "through-pillar" not only into the submerged section 1 but into the above-water section 3 as well.

The above-water section 3 is erected integrally on the intermediate section 2 and situated above the water surface W at all times. The above-water section 3 may be formed to provide an inhabitable space.

The above-water section 3 is made smaller than the submerged section 1 and in this embodiment the number of stories in the above-water section 3 is preferably less than one-half that of the submerged section 1.

The above-water section 3 consists of an outer wall 30, a lowermost floor 31, a plurality of intermediate floors 32, the latter two members being enclosed by the outer wall 30, a roof floor 33 enclosing the upper end of the outer wall 30, and partition walls 34 arranged as necessary.

The process of constructing the walls 30, 34 and floors 31, 32, 33, i.e., the process of building the above-water section 3, is carried out the same way as that for the submerged section 1 of the building. So, detailed description of this process is not given here.

Like other sections, the above-water section 3 is constructed of such materials as reinforced concrete or steel-framed reinforced concrete which have an excellent water-resisting quality and pressure withstandability. The above-water section 3 is so built as to ensure watertightness and made lighter in specific gravity than the underwater section 1.

Though not shown, the above-water section 3 may have a helicopter landing pad on the roof floor 33 to provide a means of transportation between the semisubmersible building H and land.

Holding the building body 1 stationary at a specified depth of water is performed by winding up or down the cable means $S_1$ connected at one end to the submerged section 1 and at the other end to the anchor U fixed at the bottom of the water.

The cable means $S_1$ is made of a known anchor rope or chain or any other cable which has an excellent water-and seawater-resistance and a large tensile strength. One end of the cable means is connected to the motor 52 installed in the chamber T of the building body 1 while the intermediate portion of the cable means $S_1$ is wound on a pulley or sprocket 50, 51 rotatably supported on the outside of the building body 1.

Therefore, in the semisubmersible building H of this embodiment, when the water level rises or an increased weight of the goods stored in the semisubmersible building H increases the specific gravity of the building, submerging the intermediate section 2, the motor 52 is operated to feed out the cable means $S_1$ and the water is discharged from the chamber T to reduce the specific gravity of the building. As a result, the semisubmersible building H rises causing the intermediate section 2 to project above water.

Conversely, when the water level goes down or the goods stored in the semisubmersible building H is carried out reducing the specific gravity of the building H and exposing the submerged section 1 from the water, the pumping equipment P is operated to pump water into the chamber T to increase the specific gravity of the building H, causing it to sink so that the intermediate section 2 protrudes from the water surface. The motor operation to feed out or wind up the cables as well as the operation of the pumping equipment P for water supply and discharge may be automatically controlled by signals from sensors (not shown) installed at a specified water level position on the building body 1.

As to the two operations—the winding up and down of the cable means $S_1$ by the motor 52 and the water supply and discharge to and from the chamber T by the pumping equipment P—it is of course possible to perform both of these operations simultaneously or one at a time depending on the distance that the building body 1 rises or sinks or on the configuration of the building.

Since the semisubmersible building H of this embodiment is constructed as described above, the compartmented spaces R in the submerged section 1 can be used, for example, as warehouses and garages, while the compartmented spaces R in the above-water section 3 can be used as houses, offices or warehouses. The in-water section 1 and the above-water section 3 are communicated with each other by a lifting means E such as an elevator or lift that travels through the intermediate section 2.

The semisubmersible building H can be protected against seismic effects by having the bottom of the submerged section 1 slightly afloat from the sea floor L. Since the submerged section 1 is installed underwater, there is little variation in temperature, a condition suitable for storing fresh food. Further, by automatically adjusting the water volume and the cable length, it is possible to change the buoyancy or specific gravity of the building and therefore its vertical position.

Because water can be supplied into or discharged from the water volume adjust chamber T by the pumping apparatus P installed in the intermediate section 2, the weight of the submerged section 1 can be increased to stably settle onto the sea floor L. With the underwater pressure P1 acting on the submerged section 1 set larger than the wind pressure applied to the above-water section 3, i.e., P1>P3, the semisubmersible structure H can remain stationary and stable even in stormy conditions.

The gaps in the intermediate section 2 arranged between the submerged section 1 and the above-water section 3 also have the function of letting winds pass therethrough, substantially reducing the pressure acting on the above-water section 3. The large pressure acting on the submerged section 1 can minimize the oscillation of the above-water section 3 thus providing an inhabitable space with little oscillation.

The pressure P1 exerted on the submerged section 1 represents the static water pressure or current-induced pressure acting on the entire surface of the outer wall 12 of the submerged section 1. The pressure P3 exerted on the above-water section 3 is the wind pressure acting on the entire surface of the outer wall 30 of the above-water section 3.

While in the above embodiment the semisubmersible structure H is shown to provide warehouses and garages in the submerged section 1 and inhabitable spaces for houses and offices in the above-water section 3, it is also possible to install two or more semisubmersible buildings H side by side and connect them with passages so that people and goods can be moved among these buildings, forming marine communities.

Figure 7:
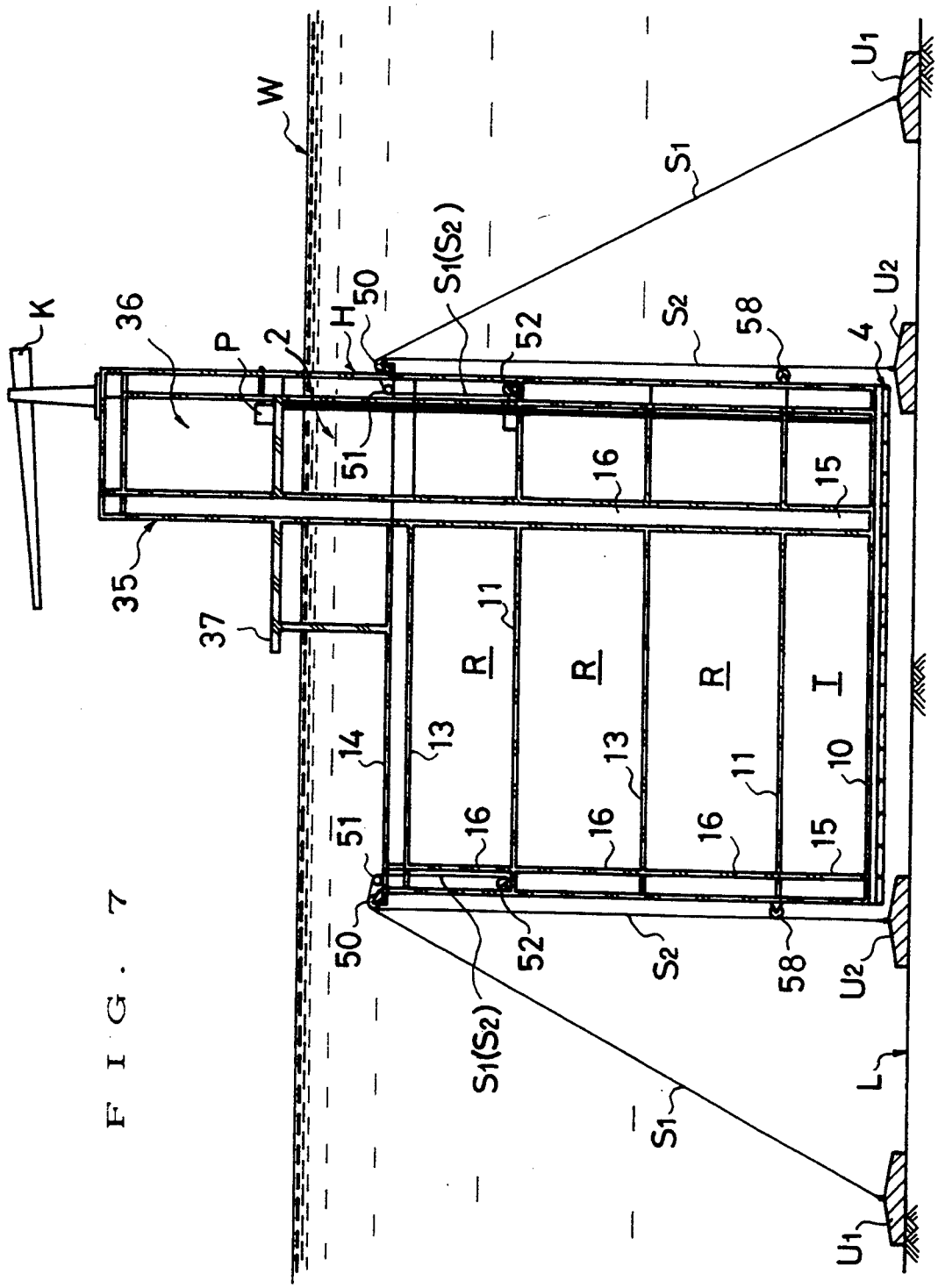
FIG. 7 is a partly cutaway vertical cross section of the semisubmersible building as a second embodiment of this invention.

FIG. 7 shows the second embodiment of the invention. The semisubmersible building B is kept stable even in the event the cables mooring the building H are cut. In this embodiment, the components that are identical with the corresponding parts of the first embodiment have the same constructions and are given like reference numerals. Detailed description of such components are omitted here.

Like the first embodiment, the semisubmersible building a of this embodiment consists of a foundation body 4 formed of steel frames, a submerged section 1 erected on the upper side of the foundation body 4, a plurality of cable means $S_1$, $S_2$ that pull and hold the submerged section 1 stationary at a specified depth of water, and an entrance tower portion 30 or above-water section that is mounted on the submerged section 1 and projects above water.

The foundation body 4 of such a construction is towed by a ship to the installation site of the semisubmersible structure H or it is built at the site. At the installation site, while afloat on the water surface W, the foundation body 4 is connected to anchors $U_1$ or $U_2$ fixed in the sea floor L to prevent it from being carried away by currents.

Like the semisubmersible building H of the first embodiment, the submerged section 1 is erected on the foundation body 4 and consists of an outer circumferential wall 12, inner circumferential wall 16, foundation floor 10, floors 11 for respective stories, ceiling floor 13, and top floor 14. Designated 37 in FIG. 7 is a helicopter landing pad and K a crane.

The submerged section 1 of this construction can be sunk by pumping water into the chamber T by a pumping equipment P installed in the entrance tower portion 30. That is, the pumping equipment P is operated to supply water into or discharge it from the chamber T to increase or decrease the weight of the submerged section 1 so that only the entrance tower portion 30 projects above the water surface and at the same time the submerged section 1 is kept stationary at a specified depth of water and at some distance from the sea floor L.

Since the pressure P1 acting on the submerged section 1 below the water surface W is set larger than the pressure P3 acting on the entrance tower portion 30 that projects above water (P1>P3), the semisubmersible building H can be kept stable with the help of cable tension even in stormy weather conditions. Further, since the submerged section 1 is set some distance from the sea floor L, it is not affected by earthquakes and is safe.

Installed in the interior 36 of the entrance tower portion 30 is an elevator or lift. The entrance tower portion 30 and the submerged section 1 are connected via an intermediate section 2 which is so constructed as to allow winds to pass through.

Holding the semisubmersible building H stationary at a specified depth of water is performed by winding up or down the cable means $S_1$, $S_2$ that are connected at one end to the anchors $U_1$, $U_2$ fixed at the sea floor L.

The cable means $S_1$, $S_2$, as in the first embodiment, are connected at one end to the anchor $U_1$ or $U_2$ fixed at the sea floor L and at the other end to the motor 52 installed in the chamber T of the submerged section 1. These cable means $S_1$, $S_2$ have their intermediate portions wound and supported on pulleys or sprockets 50, 51 that are rotatably supported on the outside of the submerged section 1. Designated 53 are pulleys or sprockets rotatably mounted on the outer circumferential wall 12 of the building body 1. One of the cable means $S_2$ is wound on the pulley or sprocket 53.

The cable means $S_1$, $S_2$ that are connected to the four corners of the submerged section 1 are used in pairs, with one of the pair $S_1$ or $S_2$ connected to the motor 52 in an untensed condition and with the other $S_2$ or $S_1$ pulling the submerged section 1 under tension.

This arrangement prevents the submersible section 1 from being carried away by currents when the tensed cable means $S_2$ or $S_1$ should break. In the event of failure of the tensed cable means $S_2$ or $S_1$ due to degradation over time, the second cable means $S_1$ or $S_2$ which is not tensed takes over to hold the semisubmersible building H in its position.

ADVANTAGES OF THE INVENTION

Because of the construction mentioned above, this invention offers the following advantages. The interior of the submerged section and the above-water section can be used for a variety of applications. Unlike the conventional construction method, the novel method employed in this invention permits the semisubmersible building to be built in a short period in the same way as ordinary on-land buildings are constructed. The work can reliably be carried out on the surface of water without being affected by waves and thus is very simple and safe. When the specific gravity of the submersible building changes as a result of changes in the weight of goods stored therein, it is possible to keep the building body stable and stationary at a specified depth of water. Because the water pressure acting on the submerged section below the water surface is set larger than the wind pressure acting on the intermediate section and the above-water section projecting above water, the semisubmersible building can maintain its stability even in stormy weather conditions. Furthermore, in the event that one of the paired cables, which is tensed, should fail due to degradation over time, the other cable in the pair takes over and holds the building body in position, keeping it from being carried away by currents.

What is claimed is:

1. A semisubmersible building, comprising:
   a building body formed as a multi-layer structure and including an entrance tower portion at the top of the building body capable of projecting above water;
   said building body having a chamber between an outer wall and an inner wall thereof, said building body also having a pumping means for submerging the building body in water by pumping water into or out of the chamber so that only said entrance tower portion formed at the top of the building body projects above water;
   a plurality of cables connected to the building body for keeping the building body stationary at a specified depth of water; and
   a winding means, installed in the building body and connected with one end of each of the cables, for winding said cables in a forward or reverse direction based upon changes in the specific gravity of the building body to keep the building body stationary at a specified depth;
   wherein said plurality of cables is made up of a plurality of pairs of cables, and including means for connecting a first of said cables from each pair of cables to the winding means in a tensed condition and for connecting a second of said cables from each pair of cables to the winding means, at a location adjacent to said first of said cables, in an untensed condition regardless of water currents and other forces acting on the building such that the second cable does not pull the building body under tension under all circumstances where said first of each said cables are operational and not failed, wherein should the first cable fail the second cable will take over and hold the building body.

2. A semisubmersible building, comprising:
   a building body formed as a multi-layer structure and including an entrance tower portion at the top of the building body capable of projecting above water;
   said building body having a chamber between an outer wall and an inner wall thereof, said building body also having a pumping means for submerging the building body in water by pumping water into or out of the chamber so that only said entrance tower portion formed at the top of the building body projects above water;
   a plurality of cables connected to the building body for keeping the building body stationary at a specified depth of water; and
   a winding means, installed in the building body and connected with one end of each of the cables, for winding said cable in a forward or reverse direction, at the same time water is pumped into or out of the chamber formed between the outer wall and the inner wall by the pumping means, based upon changes in the specific gravity of the building body to keep the building body stationary at a specified depth;
   wherein said plurality of cables is made up of a plurality of pairs of cables, and including means for connecting a first of said cables from each pair of cables to the winding means in a tensed condition and for connecting a second of said cables from each pair of cables to the winding means, at a location adjacent to said first of said cables, in an untensed condition regardless of water currents and other forces acting on the building such that the second cable does not pull the building body under tension under all circumstances where said first of each said cables are operational and not failed, wherein should the first cable fail the second cable will take over and hold the building body.

3. A semisubmersible building, comprising:
   (1) a building body which includes
      (a) a submerged section installed underwater;
      (b) an intermediate section made up of a plurality of column structures erected on the submerged section at specified intervals; and
      (c) an above-water section built upon the intermediate section so that it stays above water at all times;
   (b 2) said building body being formed as a multi-layer structure, at least in the submerged section, and having a chamber between an outer wall and an inner wall of the submerged section, and having a pumping means for submerging the building body in water by pumping water into or out of the chamber so that the above-water section always projects above water;
   (3) a plurality of cables being connected to the building body for keeping the building body stationary at a specified depth of water;
   (4) a winding means, installed in the building body and connected with one end of each of the cables, for winding said cables in a forward or reverse direction, at the same time water is pumped into or out of the chamber formed between the outer circumferential wall and the inner circumferential wall by the pumping means, based upon changes in the specific gravity of the building body to keep the building body stationary at a specified depth; and (5) wherein said plurality of cables is made up of a plurality of pairs of cables, and including means for connecting a first of said cables from each pair of cables to the winding means in a tensed condition and for connecting a second of said cables from each pair of cables to the winding means, at a location adjacent to said first of said cables, in an untensed condition regardless of water currents and other forces acting on the building such that the second cable does not pull the building body under tension under all circumstances where said first of each said cables are operational and not failed, wherein should the first cable fail the second cable will take over and hold the building body.

4. A semisubmersible building as claimed in claim 3, wherein a lifting elevator means is installed inside the intermediate section for elevating objects between the submerged section and the above-water section.

5. A semisubmersible building as claimed in claim 4, wherein said pumping means includes a pumping apparatus installed in the intermediate section.

6. A semisubmersible building as claimed in claim 1, wherein said pumping means includes a pumping apparatus installed in the entrance tower portion.

7. A semisubmersible building as claimed in claim 4, wherein the multi-layer structure of the building includes a plurality of intermediate generally horizontal floors in both said submerged section and said above-water section, wherein the above-water section is divided by said intermediate floors into a plurality of inhabitable stories, wherein the submerged section is divided by said intermediate floors into a plurality of stories, and wherein the number of stories in said above-water section is less than the one half the number of stories of the submerged section.

8. A semisubmersible building as claimed in claim 1, wherein said winding means is located in a space in a portion of said building body which is submerged beneath water level such that said cables are below the water level when installed.

9. A semisubmersible building as claimed in claim 2, wherein said winding means is located in a space in a portion of said building body which is submerged beneath water level such that said cables are below the water level when installed.

10. A semisubmersible building as claimed in claim 3, wherein said winding means is located in a space in a said submerged section which is submerged beneath water level such that said cables are below the water level when installed.

* * * * *